United States Patent
Bormioli

(10) Patent No.: US 9,518,661 B2
(45) Date of Patent: *Dec. 13, 2016

(54) PETAL CONTROL VALVE FOR SEPARABLE CONNECTION UNITS FOR FLEXIBLE HOSES

(71) Applicant: MIB Italiana S.P.A., Casalserugo PD (IT)

(72) Inventor: Lorenzo Bormioli, Padua (IT)

(73) Assignee: MIB ITALIANA S.P.A., Casalserugo PD (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/396,270

(22) PCT Filed: Apr. 24, 2013

(86) PCT No.: PCT/IB2013/053236
§ 371 (c)(1),
(2) Date: Oct. 22, 2014

(87) PCT Pub. No.: WO2013/160846
PCT Pub. Date: Oct. 31, 2013

(65) Prior Publication Data
US 2015/0083952 A1 Mar. 26, 2015

(30) Foreign Application Priority Data
Apr. 26, 2012 (IT) .............................. MI2012A0695

(51) Int. Cl.
*F16K 1/16* (2006.01)
*F16K 1/20* (2006.01)
(Continued)

(52) U.S. Cl.
CPC ................. *F16K 1/165* (2013.01); *F16K 1/20* (2013.01); *F16K 1/205* (2013.01); *F16K 3/03* (2013.01);
(Continued)

(58) Field of Classification Search
CPC .. Y10T 137/1624; E21B 33/06; E21B 33/061; E21B 33/064; F16K 3/03; F16K 1/165; F16K 1/18; F16K 1/20; F16K 1/2042; F16K 1/205
(Continued)

(56) References Cited

U.S. PATENT DOCUMENTS 3,887,158 A * 6/1975 Polk .............................. 251/1.1
4,326,555 A 4/1982 Thomson
(Continued)

FOREIGN PATENT DOCUMENTS

IT MI20092146 A1 6/2011
IT MI20102247 A1 6/2012
(Continued)

*Primary Examiner* — Matthew W Jellett
(74) *Attorney, Agent, or Firm* — Jacobson Holman, PLLC.

(57) ABSTRACT

Control valve (5, 5') for connection units for flexible hoses, comprising a plurality of petals (segments or sectors) (6, 7; 6', 7') rotatable between a position of complete opening and a position of complete closing. The aforesaid petals (6, 7; 6', 7') are rotatable around pivoting axes defined by spherical pins (70) interposed between laterally adjacent petals and provided with a threaded positioning neck (71) inserted and screwed in a respective radial hole (72) of the body (1, 2) of the connection unit. A locking cap (73) is screwed in said radial hole (72) and tightly abutting against said neck (71) of the spherical pin (70) for keeping said spherical pin (70) in a suitable position to enable a correct and precise pivoting between the two adjacent petals (6, 7; 6', 7').

4 Claims, 12 Drawing Sheets

(51) Int. Cl.
*F16K 3/03* (2006.01)
*F16L 55/10* (2006.01)
*E21B 33/06* (2006.01)

(52) U.S. Cl.
CPC ........ *F16L 55/1007* (2013.01); *F16L 55/1018* (2013.01); *E21B 33/06* (2013.01); *E21B 33/061* (2013.01)

(58) Field of Classification Search
USPC ................. 251/1.1, 149–149.2, 151, 212
See application file for complete search history.

(56) References Cited

U.S. PATENT DOCUMENTS 6,375,155 B1 * 4/2002 Janssens ................. 251/212
8,998,171 B2 * 4/2015 Bormioli ............... 251/149.2

FOREIGN PATENT DOCUMENTS

| IT | MI20102248 A1 | 6/2012 |
|---|---|---|
| WO | 2012/076240 A1 | 6/2012 |
| WO | 2012/076242 A1 | 6/2012 |

* cited by examiner

PETAL CONTROL VALVE FOR SEPARABLE CONNECTION UNITS FOR FLEXIBLE HOSES

The present invention relates to a petal control valve for separable connection units for hoses for transferring fluid products, in particular petroleum products.

It is known that sea transfer of petroleum products from petrochemical installation, from platform, from tanker to tanker, from tanker to land installation and vice versa is carried out through flexible hoses and hose connection units which consist of two separable parts, each provided with a respective control valve which automatically closes upon separation to limit the spillage of product into the sea, with consequent less pollution of the latter. These connection units are placed on the part of the flexible hose positioned in the sea and have the primary objective of protecting the hose, and more in general the connection line, in case of abnormal situations which cause excessive pulling on the hose or excessive pressure on the line. Such abnormal situations may be: breaking away and drifting off of tankers or more in general petroleum installations (FPSO) thus stretching the flexible hose, rough sea causing traction on the hose beyond the limits, boat knocking into the hose and dragging it away thus creating excessive loads thereon, quick closing of the valve downstream of the flow or any other reason causing excessive axial load and/or pressure increase.

The currently available connection units are made so that the control valves are automatically closed after the separation of the two parts of the connection unit, i.e. without control by an operator in the aforesaid situations.

Fluid control valves of the petal type are also known, i.e. consisting of a plurality of rotatable segments or sectors, which are rotated between an opening position, in which the petals are substantially parallel to the flow direction of the petroleum product, and a closing position in which the petals converge transversally to the axis of the unit to block the product flow. The movement from the opening position to the closing position occurs under the bias of elastic means when the retaining action exerted, for example, by an axially removable inner sleeve ceases due to the axial traction stress imposed on the connection unit. Fluid dynamic brakes appropriately slow down the closing speed of the upstream valve to avoid excessive pressure, called water hammer, determined by the combined action of the elastic means and of the pressurized fluid, which may have destructive effects on the control valve and on the connection unit itself. A petal control valve is described for example in patent applications MI2010A002247 and MI2010A002248, filed on 6 Dec. 2010.

The problem of pivoting the petals exists in the valves of the aforesaid type, because the pivoting movement must be accurate, reliable and externally accessible from the connection unit for adjusting and possibly replacing the pins used.

Therefore, it is an object of the present invention to provide a petal control valve for separable connection units for hoses for transferring fluid products, which have an effective pivoting system of the rotational petals.

In accordance with the invention, such an object is achieved by means of the use of spherical pins interposed between laterally adjacent petals and provided with a threaded positioning neck inserted and screwed into a respective radial hole of the body of the connection unit.

A locking cap screwed in turn into said radial hole and tightly abutting against said neck of the spherical pin for keeping the spherical pin in a suitable position to enable a correct and precise pivoting between the two adjacent petals and to prevent the pin from rotating and displacing from the set position.

The features of the present invention will become further apparent from the following detailed description of an embodiment thereof, shown by way of non-limitative example in the accompanying drawings, in which:

FIGS. 1 and 2 respectively show a side view and an axial section view, taken along line II-II in FIG. 1, of the connection unit for flexible hoses with petal control valves according to the present invention;

The two parts 1 and 2 are connected by burst screws 3, which break in case of strong traction stress (equal to or higher than the setting load), thus allowing to separate the two parts.

A cylindrical sliding sleeve 4 (FIG. 2) is arranged within the connection unit, which sleeve is automatically and axially removable from the connection unit when the two parts of the unit are separated.

The cylindrical sleeve 4 keeps the normally open position of two rotatable sector valves 5-5' placed upstream and downstream in the flow direction of the petroleum product, respectively.

The functions and operative modes of the sleeve 4 are described, for example, in Italian patent application MI2009A002146 filed on 4 Dec. 2009 by the Applicant.

Figure 1:
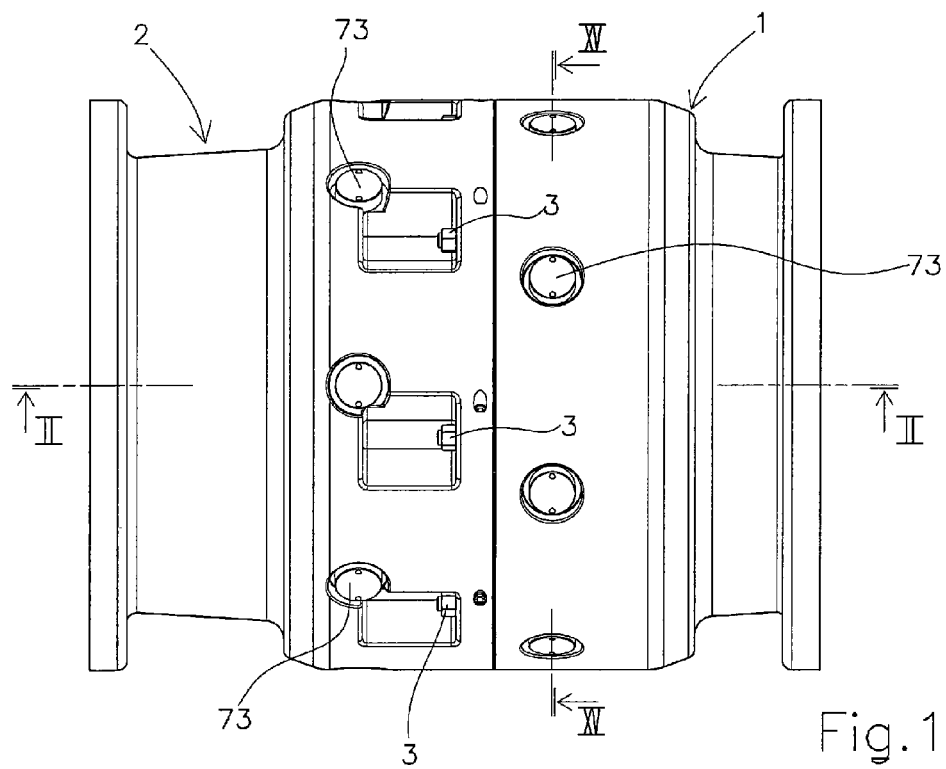
FIG. 1 shows a connection unit for flexible hoses, which comprises two separable valve parts or bodies 1 and 2, upstream and downstream in the flow direction of the transported fluid product (from right to left in FIG. 2), respectively.
Figure 2:
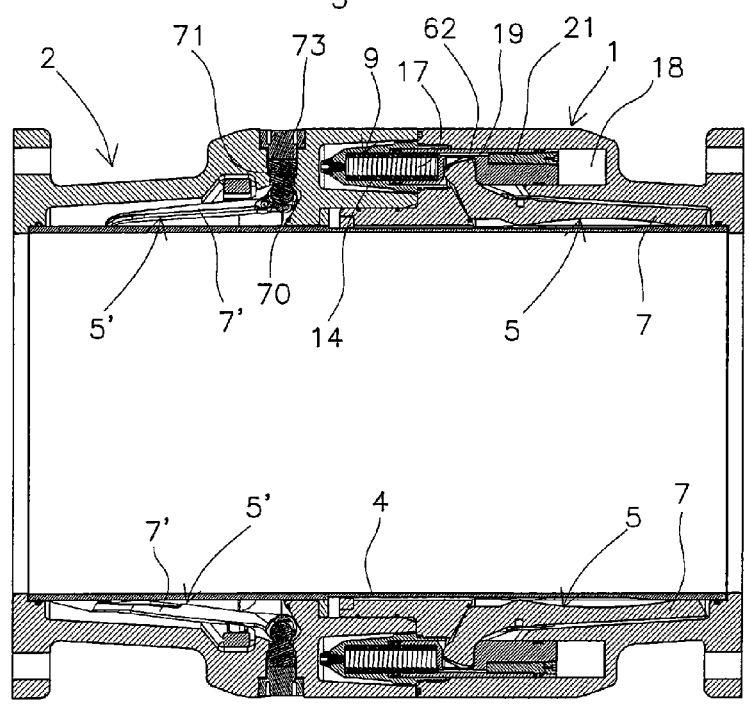
Figure 3:
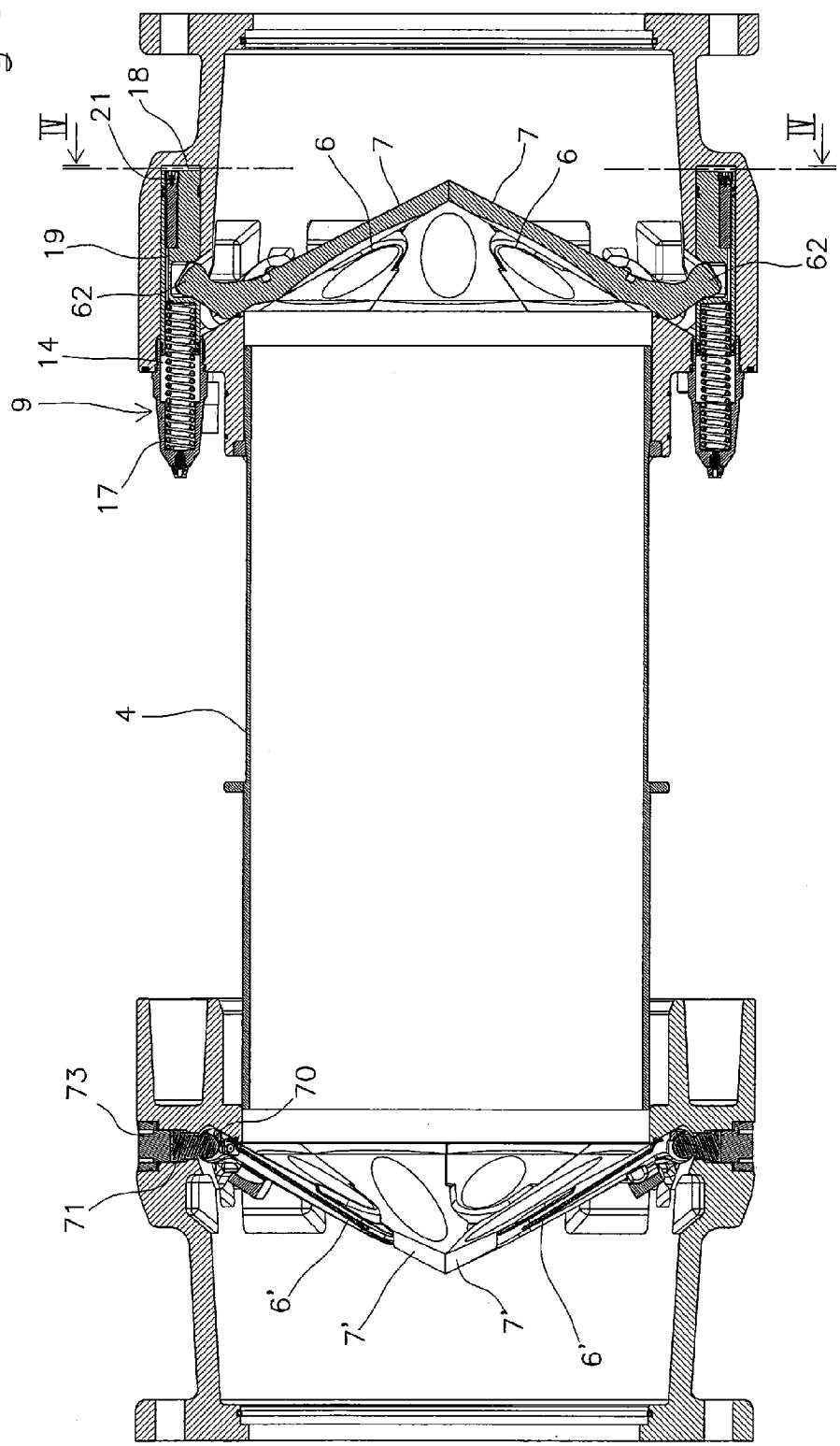
FIG. 3 shows an axial section view of the same connection unit during a two-parts separating process with the control valves already closed.
Figure 4:
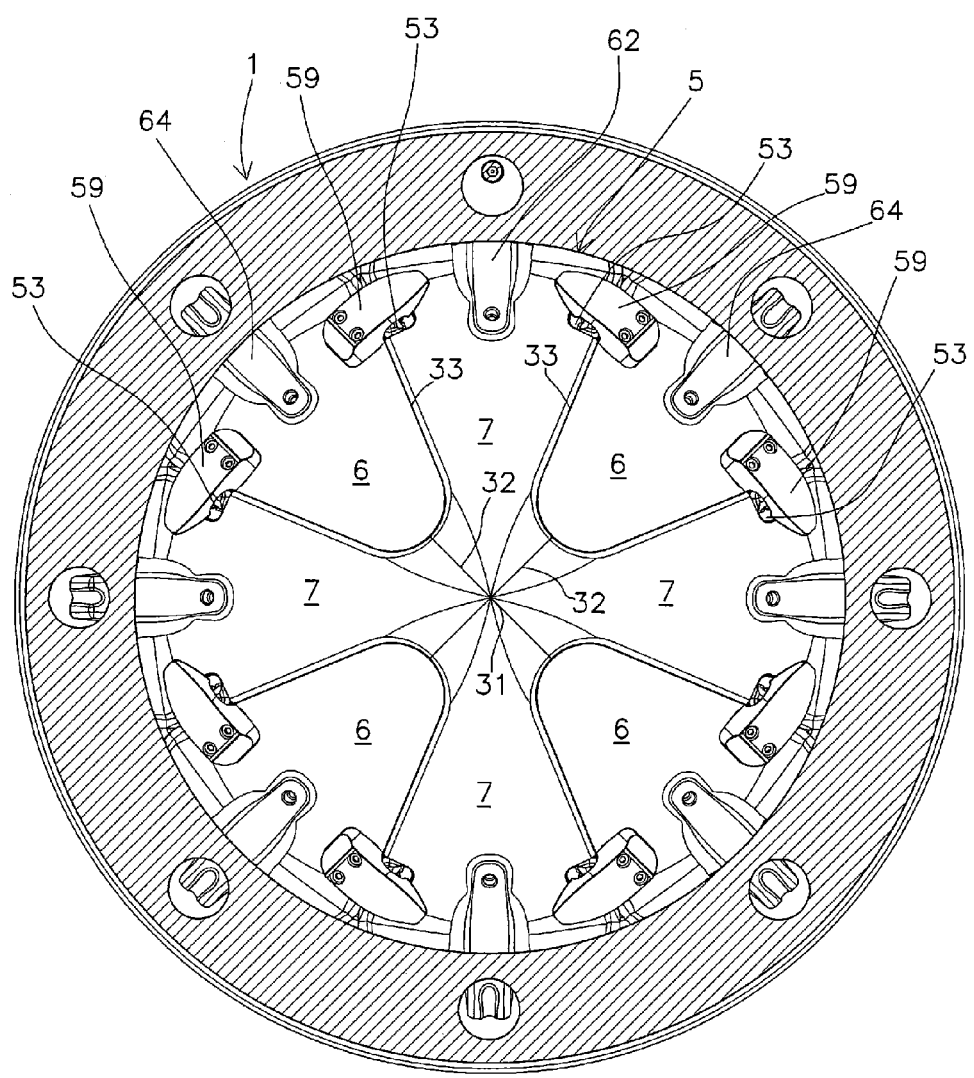
FIG. 4 shows a section view of the connection unit taken along line IV-IV in FIG. 3.
Figure 5:
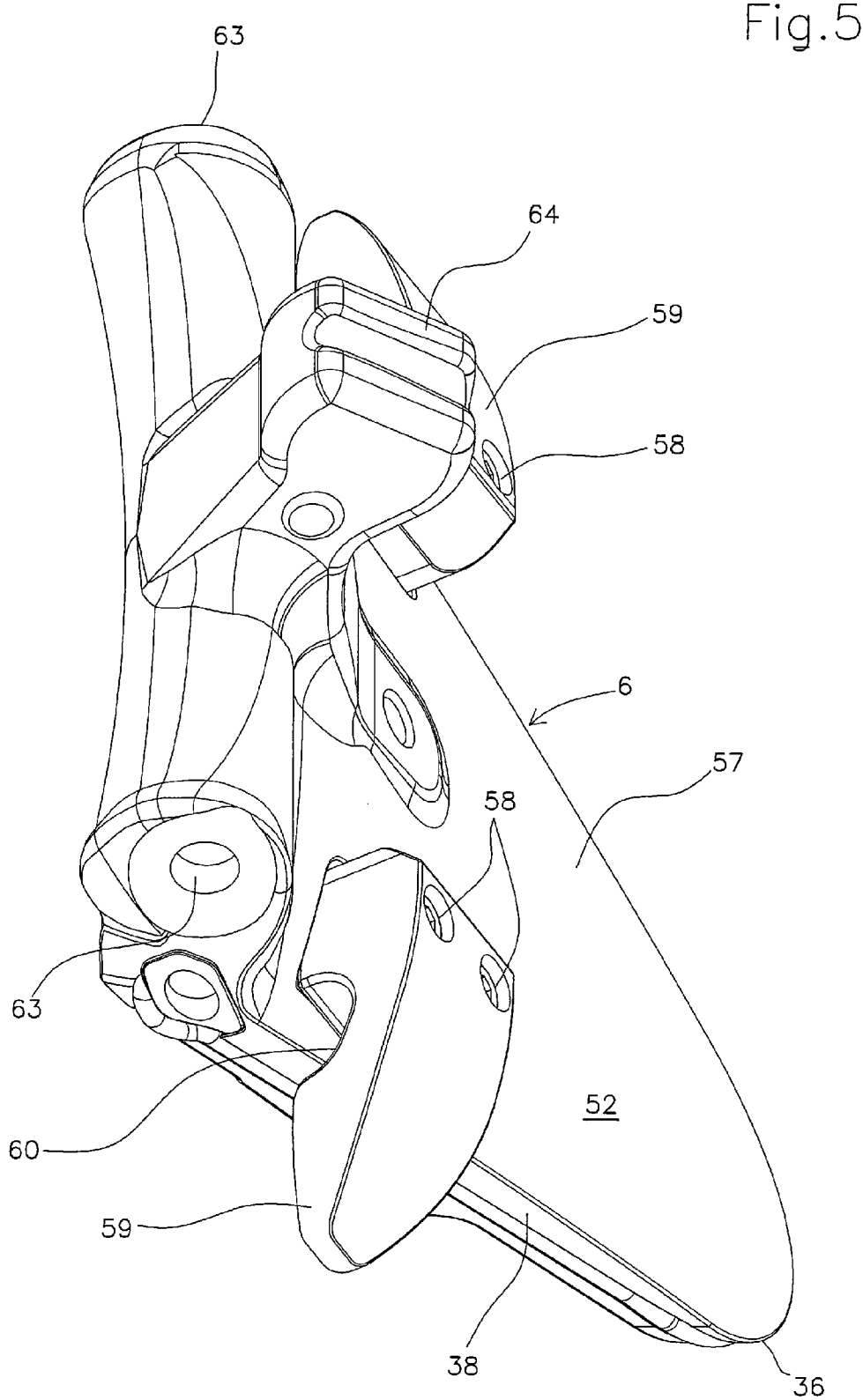
FIG. 5 shows by way of example a perspective view of one of the petals of smaller size of the control valve which is upstream in the flow direction of the fluid product.
Figure 6:
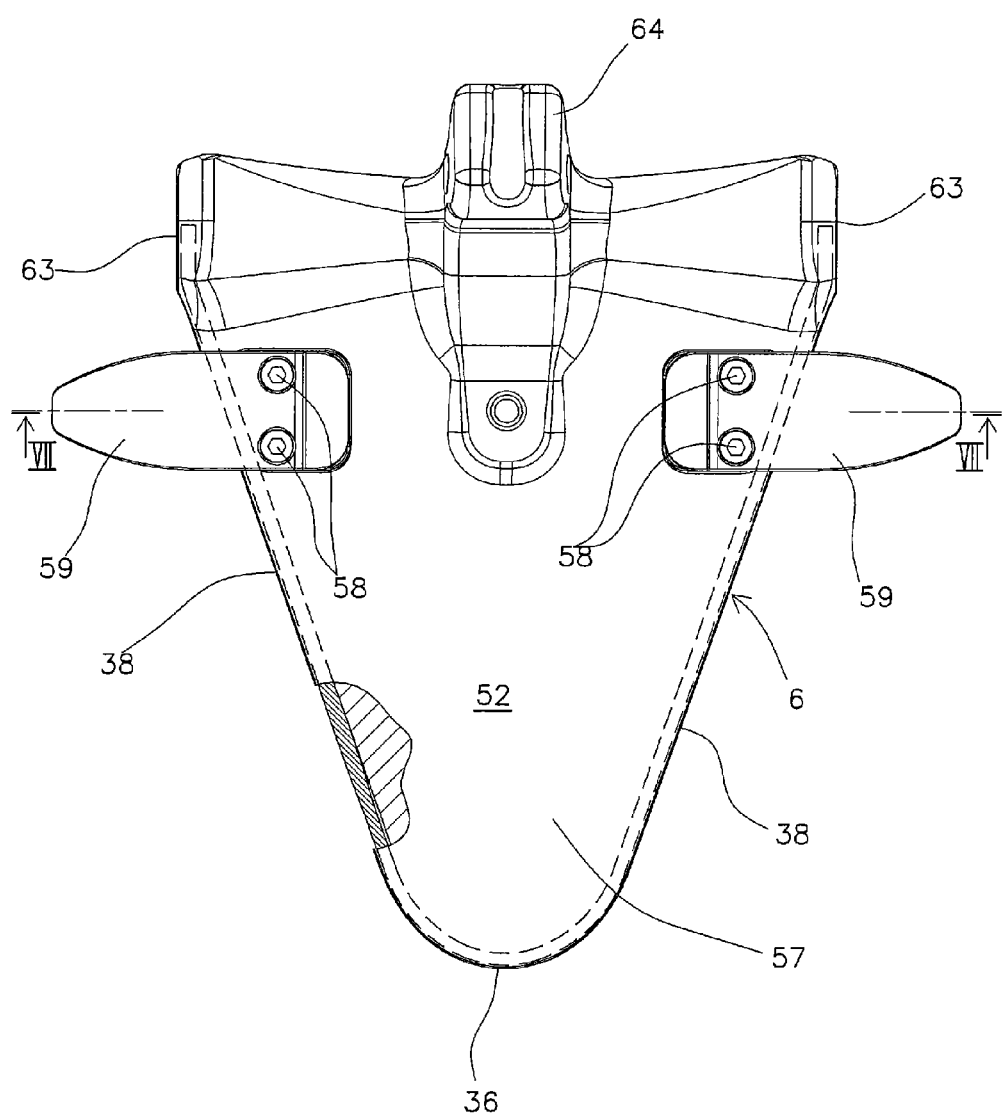
FIG. 6 shows a plan view of the same petal.
Figure 7:
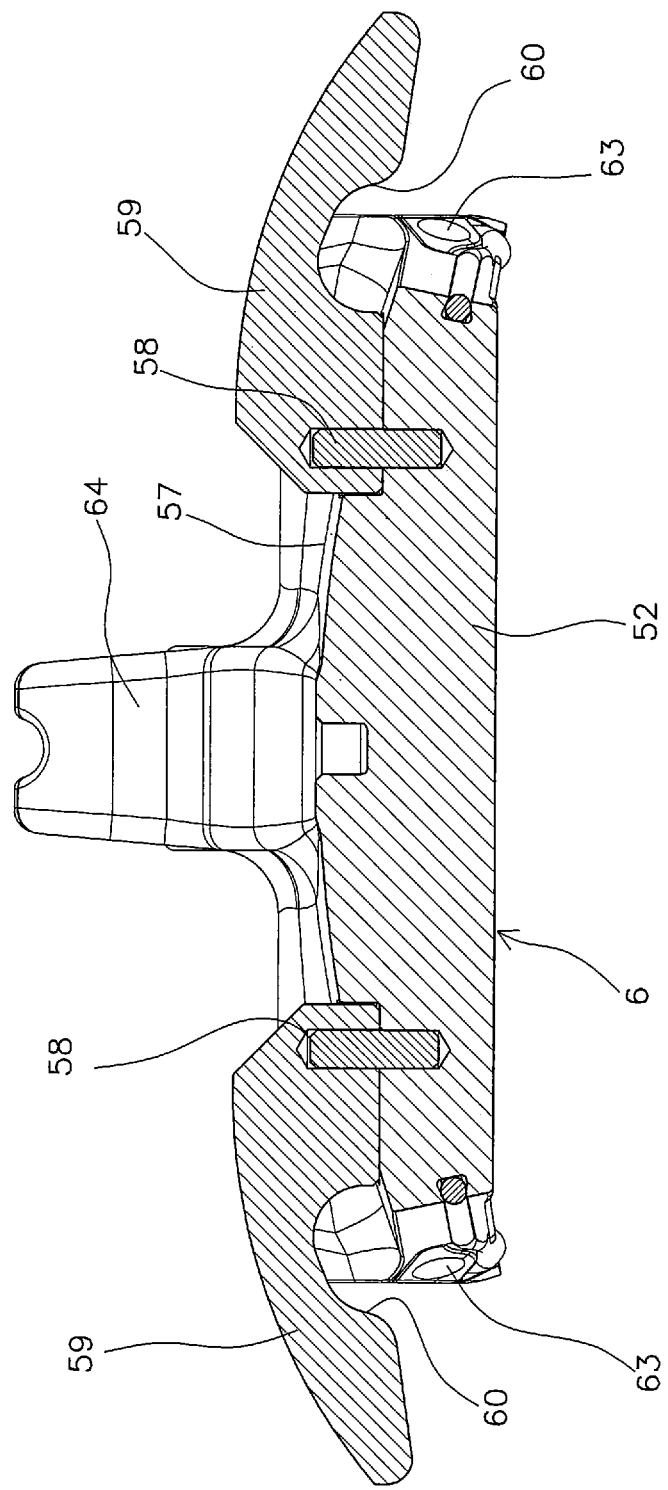
FIG. 7 shows a section view of the same petal taken along line VII-VII in FIG. 6.
Figure 8:
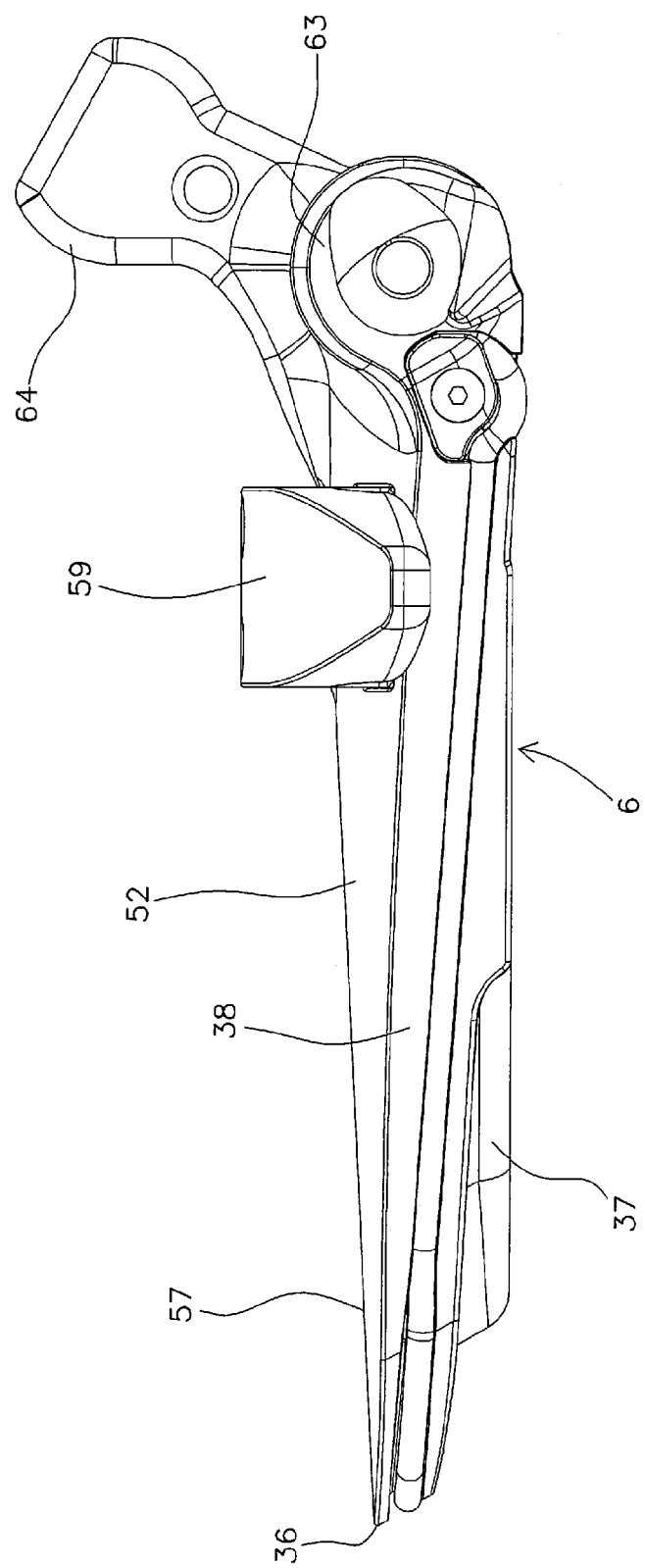
FIG. 8 shows a side view of the same petal.
Figure 9:
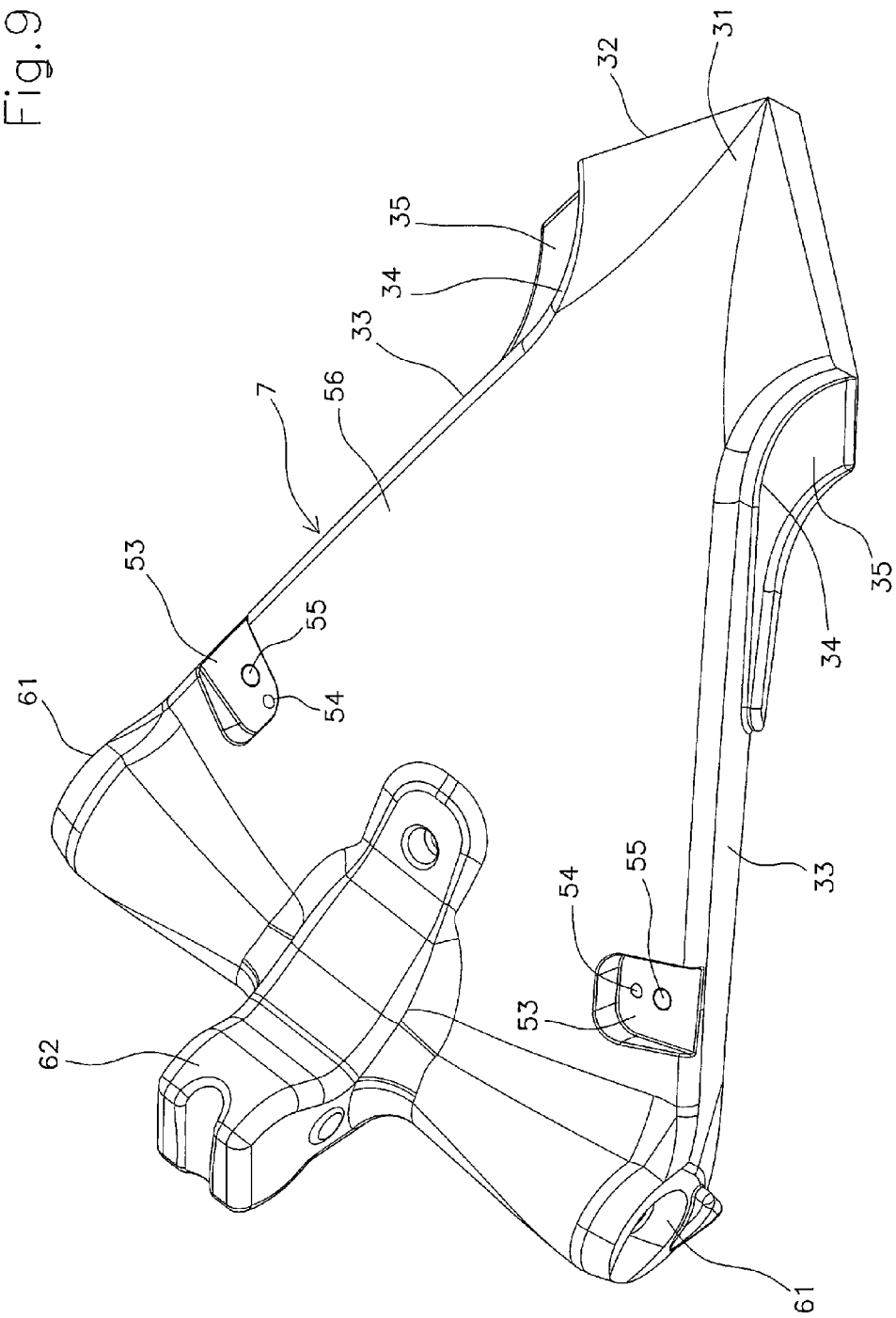
FIG. 9 shows by way of example a perspective view of one of the petals of larger size of the control valve which is upstream in the flow direction of the petroleum product.
Figure 10:
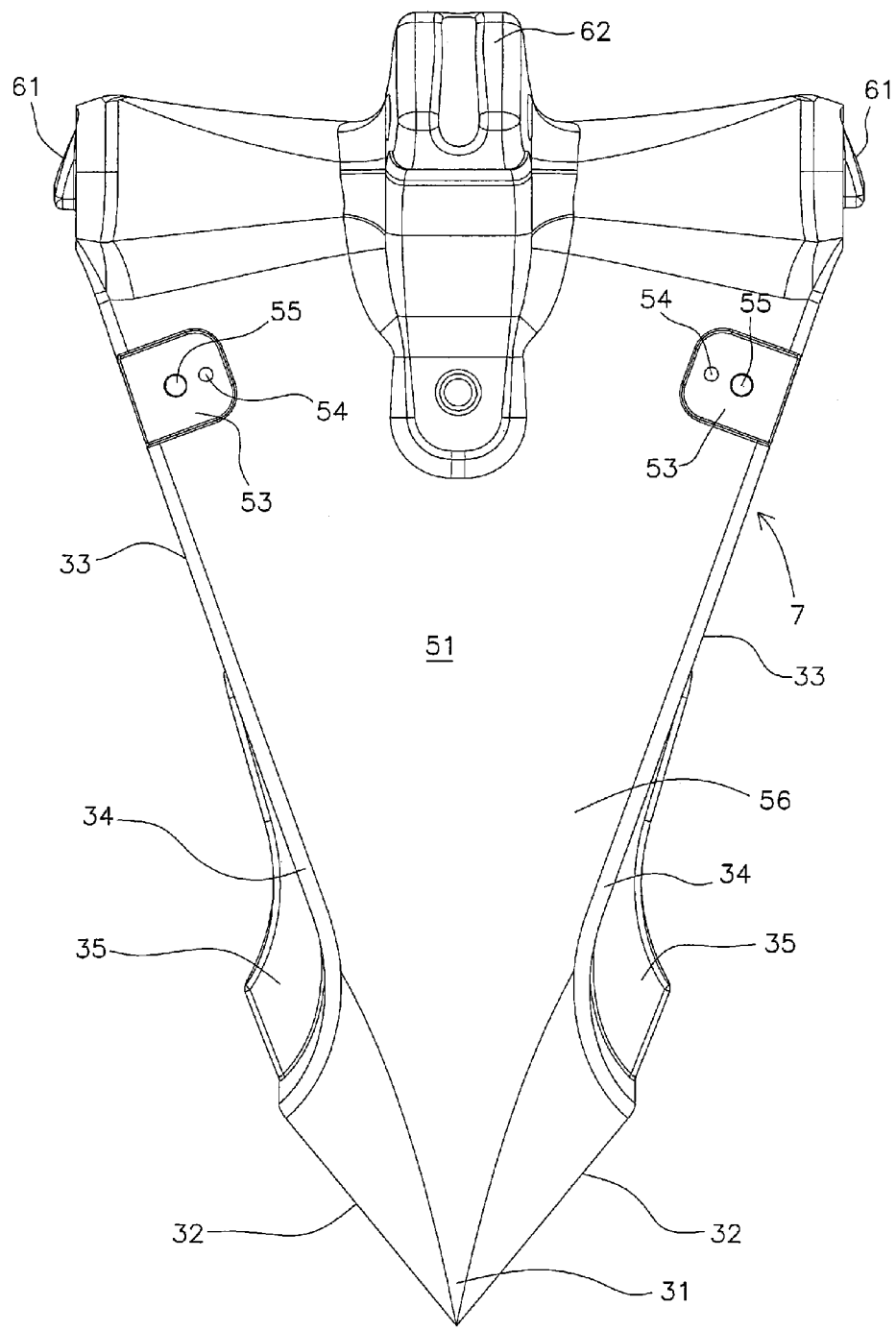
FIG. 10 shows a plan view of the same petal in FIG. 9.
Figure 11:
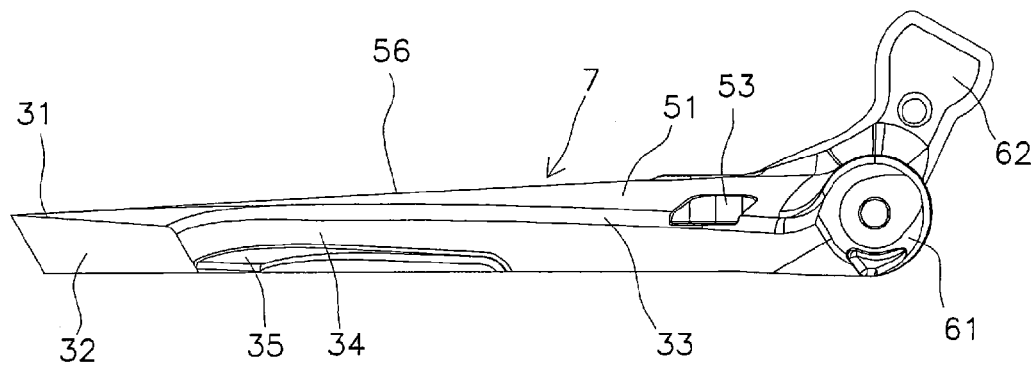
FIG. 11 shows a side view of the same petal in FIG. 9.
Figure 12:
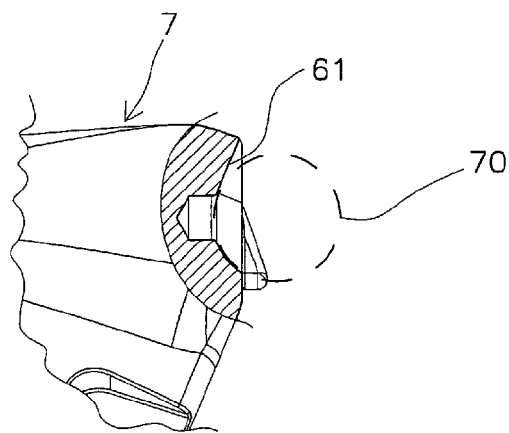
FIGS. 12 and 13 show a partially sectioned view of the housing seats of the spherical pins with which the petals in FIGS. 5-8 and 9-11 are provided.
Figure 13:
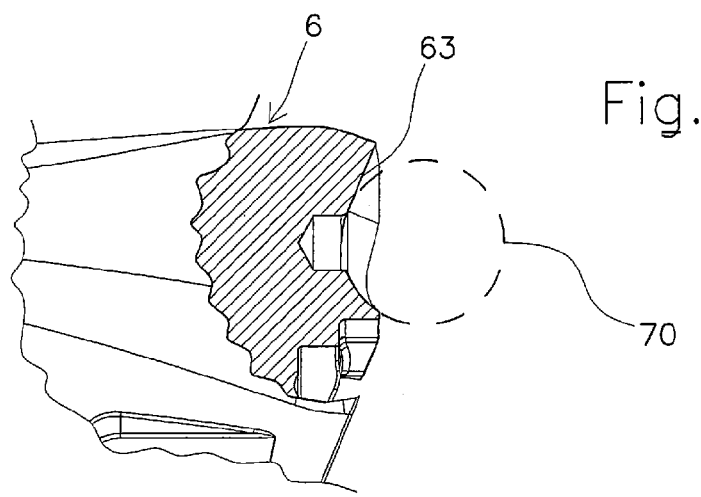

Each valve 5-5' consists of two series of petals or segments 6-7 and 6'-7' of different shape and sizes, which alternate circumferentially and are rotatable about respective axes between the opening position in FIG. 2 and the closing position in FIGS. 3 and 4.

FIGS. 5-14 show in detail the shape and function of the petals 6 and 7 of the upstream control valve 5, made in accordance with the present invention. The shape of petals 6' and 7' of the downstream valve 5' is similar.

A petal 7 of larger size is shown in FIGS. 9-13, where it is seen consisting of an approximately triangular body 51 which is provided with a V-shaped end 31, the sides 32 of which are intended to fluid tightly abut against the corresponding sides of the other adjacent petals 7. Petal 7 has lateral sides 33 with a curved end 34, which include a step 35 on which a side of the petal 6 of smaller size interposed between two petals 7 of larger size rests when valve 5 is closed. Two oblique projections 53 overlap and are integral (or restrained at fixing points 54 and 55) to the upstream surface 56 of body 51 which faces the flow of petroleum product when the valve is closed. Petal 7 also includes partially spherical pivoting points 61 (shown in greater detail in FIG. 13) and a control heel 62.

A petal 6 of smaller size is shown, in turn, in FIGS. 5-8, where it is seen consisting of an approximately triangular body 52 which is provided with a rounded end 36 with step 37 (FIG. 8), which tightly engages the curved ends 34 of two adjacent petals 7 when valve 5 is closed, and with straight sides 38 which tightly engage the lateral sides 33 of the two adjacent petals 7 when valve 5 is closed. Two fins 59, which laterally protrude from the sides 38 and are provided with curved recesses 60 adapted to house, when the valve is closed, the corresponding projections 53 of the adjacent petals 7 (as shown in greater detail below), overlap and are restrained at fixing points 58 to the upstream surface 57 of the body 52. Petal 6 also includes partially spherical pivoting points 63 (shown in greater detail in FIG. 12) and a control heel 64.

Figure 14:
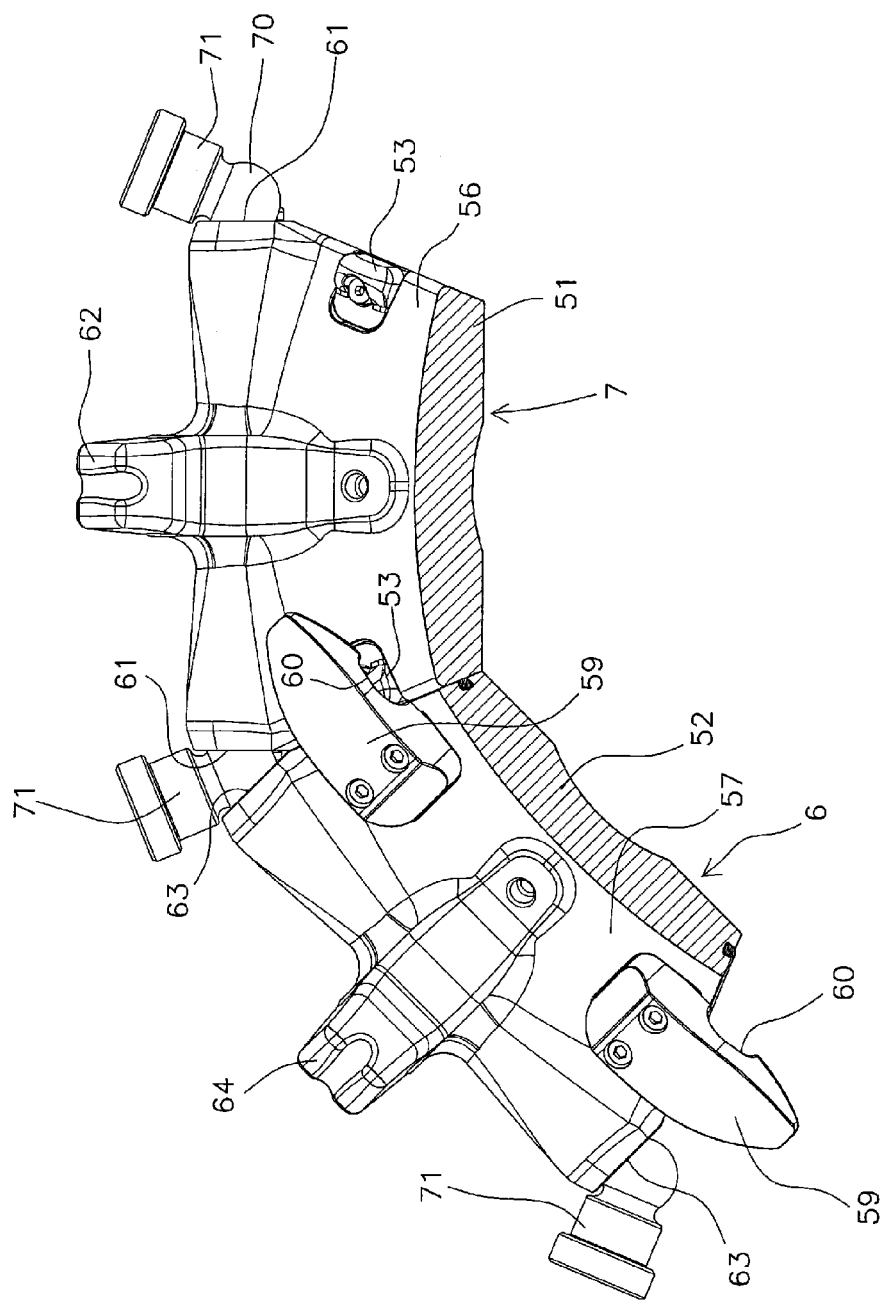
FIG. 14 shows how a petal of smaller size overlaps a petal of larger size in the closing position of the valve to which said petals belong.
Figure 15:
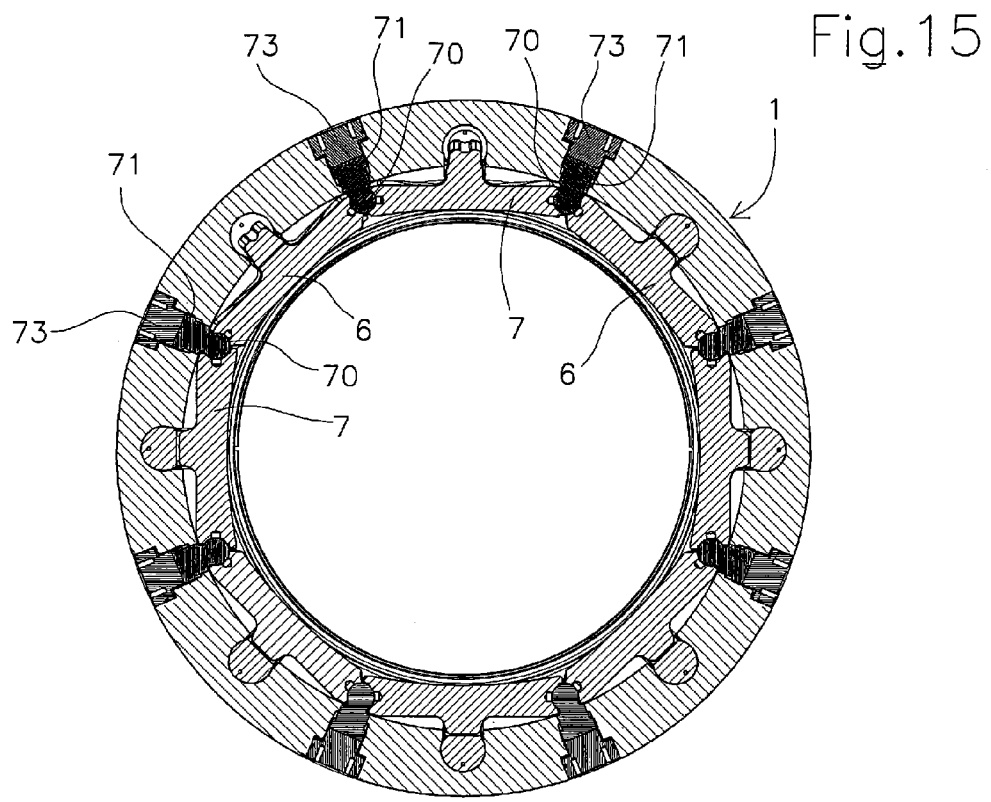
FIG. 15 shows a cross-section view of the connection unit through the pivoting points of the petals according to line XV-XV in FIG. 1.
Figure 16:
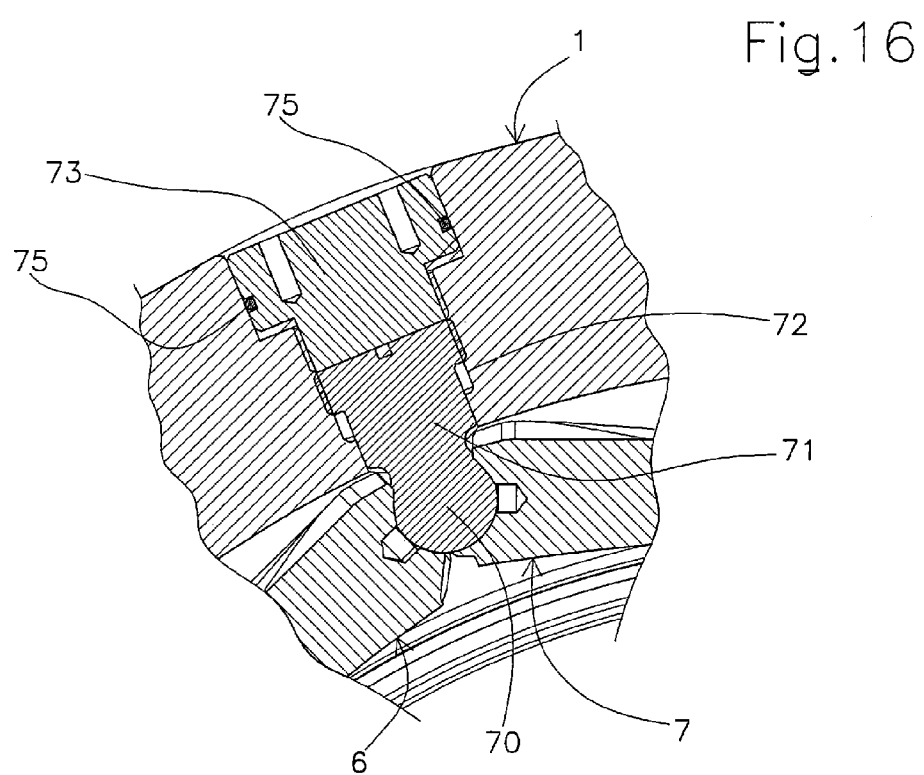
FIG. 16 shows an enlarged detail of one of the pivoting points shown in FIG. 15.

Petals 7 and 6 can rotate about respective axes and pivoted to one another by means of spherical pins 70, shown in FIGS. 14, 15 and 16, which are rotationally housed in the partially spherical seats 61 and 63 of the aforesaid petals. Each spherical pin 70 is provided with a threaded positioning neck 71 (FIG. 16) which is inserted and screwed into a respective radial hole 72 of the body of the connection unit. A locking cap 73 is screwed into the same hole 72 and acts on the neck 71 to keep the spherical pin 70 in the correct position. A sealing gasket 75 is interposed between the lateral surfaces of cap 73 and hole 72 to avoid leakages of fluid through the pivoting points.

Similar spherical pins 70 with neck 71 and locking cap 73 are provided for the petals of control valve 5', as shown in FIGS. 2 and 3.

FIGS. 4 and 14 show the closing configuration of the petals 7 and 6 of the control valve 5. The configuration of the petals 7' and 6' of valve 5' is entirely similar.

The movement of the single petals 7 and 6 from the opening position to the closing position is controlled by an automatic closing device 9 of the type described in Italian patent application MI2010A002248, filed on 6 Dec. 2010, which acts on the heels 62 and 64 under the bias of helical springs 17 when sleeve 4, according to the modes explained in Italian patent MI2009A002146, is axially pulled out from the interior of valve 5, thus ceasing the retaining action of the rotatable petals 6 and 7 of the valve itself.

The closing movement of the petals 7 and 6 of valve 5 is braked by the controlled leakage of a braking fluid of the viscous type from the housing chambers 18 of the fluid itself to the housing chambers 14 of the springs 17 through leakage pipes 19 in which flow speed adjustment cartridges 21 having a helical external groove are inserted.

The leakage speed of the braking fluid is adjusted by means of differently grooved cartridges 21, so as to determine different rotation, and thus closing, speeds of the single petals of valve 5. More specifically, the closing speed of the petals 7 of larger size is set so as to be faster than that of the petals 6 of smaller size, which consequently overlap and partially rest on the edges of the adjacent petals 7, thus achieving the closing configuration in FIG. 4. This allows to obtain a closure which limits the release of product to the maximum when closing the control valve 5, thus limiting the pressure peak generated by the water hammer of the petroleum product to acceptable levels.

The fins 59 of the petals 6 of smaller size avoid any early closing of the petals 7 of larger size, and when housing the projections 53 of petals 7 in their recesses 60, allow an accurate placement of the petals in the tight closing position, as shown in FIG. 14.

The petals 6'-7' of the downstream control valve 5' in the flow direction of the fluids are similarly provided with fins and projections similar to the fins 59 and the projections 53 of petals 6-7, and are in turn provided with automatic closing devices, described in patent application MI2010A002248, which by means of appropriate springs act on the heels of petals 6' and 7' to determine the rotation and thus the automatic closing of petals 6' and 7' when sleeve 4 is pulled out (FIG. 3). The braking effect is here determined by the pressurized fluid inside the joining part 2.

For units having a one-direction flow, the downstream valve may thus not be provided with a braking system but only with the automatic closing device biased by a spring.

The invention claimed is:

1. A control valve for connection units for flexible hoses, comprising a plurality of petals, segments or sectors rotatable between a position of complete opening and a position of complete closing, wherein said petals are rotatable around pivoting axes defined by spherical pins interposed between laterally adjacent petals and provided with a threaded positioning neck inserted and screwed in a respective radial hole of a body of a connection unit, wherein the petals with larger size have a V-shaped end, the sides of which are intended to fluid-tightly abut against the corresponding sides of other petals of larger size, and also with lateral sides with a curved end which include a step on which a side of a petal of smaller size interposed between two petals of larger size rests when the valve is closed, and in that the petals of smaller size have a rounded end with a step, which tightly engages the curved ends of two adjacent petals when the valve is closed, and straight sides on which the step continues, which tightly engage the lateral sides of the two adjacent petals when the valve is closed.

2. The control valve according to claim 1, wherein a locking cap is screwed in said radial hole and tightly abutting against said neck of the spherical pin for keeping said spherical pin in a suitable position to enable a pivoting between the two adjacent petals.

3. The control valve according to claim 2, wherein it comprises a sealing gasket inserted between said locking can and said radial hole.

4. The control valve according to claim 2, wherein said petals are provided with partially spherical seats for housing said spherical pins.

* * * * *